US008428990B2

United States Patent
Moll et al.

(10) Patent No.: US 8,428,990 B2
(45) Date of Patent: Apr. 23, 2013

(54) METHOD FOR ALLOCATING RESOURCES TO JOBS USING NETWORK FLOW ALGORITHMS

(75) Inventors: Christoph Moll, München (DE); Thomas Nüssler, München (DE)

(73) Assignee: Siemens Aktiengesellschaft, Munich (DE)

( * ) Notice: Subject to any disclaimer, the term of this patent is extended or adjusted under 35 U.S.C. 154(b) by 1165 days.

(21) Appl. No.: 11/990,635

(22) PCT Filed: Jul. 14, 2006

(86) PCT No.: PCT/EP2006/064290
§ 371 (c)(1),
(2), (4) Date: Feb. 19, 2008

(87) PCT Pub. No.: WO2007/020144
PCT Pub. Date: Feb. 22, 2007

(65) Prior Publication Data
US 2009/0138312 A1    May 28, 2009

(30) Foreign Application Priority Data
Aug. 19, 2005  (DE) .......................... 10 2005 039 341

(51) Int. Cl.
*G06Q 10/00*    (2012.01)
(52) U.S. Cl.
USPC ........................................ 705/7.12

(58) Field of Classification Search .................. 705/7.12
See application file for complete search history.

(56) References Cited

U.S. PATENT DOCUMENTS

| | | | | |
|---|---|---|---|---|
| 5,343,388 A | * | 8/1994 | Wedelin ........................ | 705/7.13 |
| 5,524,077 A | * | 6/1996 | Faaland et al. ............... | 705/7.21 |
| 5,913,201 A | * | 6/1999 | Kocur ........................... | 705/7.17 |
| 6,578,005 B1 | * | 6/2003 | Lesaint et al. ............... | 705/7.14 |
| 2004/0088207 A1 | * | 5/2004 | Fromherz ....................... | 705/8 |
| 2004/0248576 A1 | * | 12/2004 | Ghiglino et al. ............. | 455/445 |
| 2006/0029033 A1 | * | 2/2006 | Lee ............................... | 370/351 |
| 2007/0195700 A1 | * | 8/2007 | Katoh et al. .................. | 370/235 |

OTHER PUBLICATIONS

Srivastava, B. et al., Planning the project management way: Efficient planning by effective integration of casual and resource reasoning in RealPlan. In: Artificial Intelligence. ISSN: 0004-3702, 2001, vol. 131, issues 1-2, pp. 73-134. (=http://citeseer.ist.psu.edu/papers/cs/14668/http:zSzzSzrakaposhi.eas.asu.eduaSzrealplan-jour.pdf/srivastava00planning.pdf).

International Search Report for Application No. PCT/EP2006/064290; mailed Oct. 20, 2006.

* cited by examiner

*Primary Examiner* — Johnna Loftis
*Assistant Examiner* — Brandi P Parker
(74) *Attorney, Agent, or Firm* — Staas & Halsey LLP

(57) ABSTRACT

A resource allocation system is described in which resources and jobs are arranged as a network flow graph. In the system, resources are allocated to jobs using a network flow algorithm applied to the graph. The algorithm is applied from a graph source to a graph sink by finding a solution progressively for each time interval.

9 Claims, 2 Drawing Sheets

METHOD FOR ALLOCATING RESOURCES TO JOBS USING NETWORK FLOW ALGORITHMS

CROSS REFERENCE TO RELATED APPLICATIONS

This application is based on and hereby claims priority to International Application No. EP2006/064290 filed on Jul. 14, 2006, and German Patent Application 10 2005 039 341.1, filed Aug. 19, 2005, the contents of both of which are hereby incorporated by reference.

BACKGROUND

The present invention lies in the field of work planning or work organization and relates especially to a method for allocating to jobs resources equipped with the respective aptitudes/suitabilities for fulfilling jobs, in which an allocation of the resources to the jobs is determined on the basis of a network flow algorithm.

The allocation of resources (machines or people) to jobs which are to be fulfilled within a certain time window is a problem which is comparatively easy to resolve for a small number (for example <10) of resources and jobs, but which is complex and demands a high processing outlay for a large number (for example >1000) of resources and jobs. This problem has previously been solved using conventional optimization algorithms which in general however have to run for several hours to deliver a result. This renders short-term changes in planning, which can be necessary if resources fail or if the parameters of the problem change, practically impossible and also extremely expensive from the cost standpoint. Interactive planning, in which the planner has an influence on the allocation result, has thus not been possible previously.

SUMMARY

By contrast an object of the embodiments discussed herein includes providing a method for allocating resources to jobs in which a (if necessary interactive) simultaneous resource allocation and scheduling is made possible, with simple constraints for a large number of resources and jobs.

In accordance with the embodiments this abject is achieved by a method with the features discussed herein. Advantageous additional embodiments of the invention are specified by the features discussed herein.

According to an embodiment a method is shown for determining an allocation of m resources $R_m$ equipped with the respective aptitudes/suitabilities for fulfilling jobs, which are available at particular times, to k jobs $J_k$, whereby, in such an assignment the m resources will be allocated to the k jobs, which are to be handled within a time window belonging to the respective job in each case where m, n are natural numbers >1.

The major elements distinguishing the inventive method include the following operations:

The m resources and the n jobs are embodied or arranged in a network flow graph, as is known per se in graph theory, with the resources and the jobs each being modeled as nodes of the network flow graph, which are connected by connectors to each other, as well as being connected to a source and a sink.

A set of first to nth allocations of the m resources to the k jobs on the basis of the network flow graph is determined. Each "allocation", as such, generally includes in this case, a plurality of assignments of the m resources to the k jobs, for n different time intervals respectively, in which the jobs and resources do not change. An allocation is determined by applying a network flow algorithm to the network flow graph. The first to ith allocations in this case are obtained by applying the network flow algorithms l times to the network flow graph. In more precise terms, the first allocation of the m resources to the k jobs is obtained by applying the network flow algorithm to the first through nth time intervals in which the respective jobs are to be dealt with. The second allocation of the m resources to the k jobs is obtained by applying the network flow algorithm to the network flow graph for only the second through nth time window of the n time intervals, with the allocation of a resource to the job belonging to the first time interval, which was obtained in the first application of the network flow algorithm to the network flow graph, being kept constant for the second application of the network flow algorithm to the network flow graph. The third allocation of the m resources to the k jobs is obtained by again applying the network flow algorithm to the network flow graph for the third through nth time window of the n time intervals of the k jobs, with the assignments of resources to the jobs belonging to the first and second time windows, which were obtained in the first or second application of the network flow algorithm to the network flow graph, being kept constant for the third application of the network flow algorithm to the network flow graph. An ith allocation of the m resources to the k jobs by the ith application of the network flow algorithm to the network flow graph for the ith time interval of the n time intervals of the l jobs is obtained in a similar manner, with the assignments for the time intervals belonging to the first through ith jobs, which were obtained in the previously executed i–1 applications of the network flow algorithm to the network flow graph, being kept constant for the ith application of the network flow algorithm.

In other words, for each repeated pass (i.e. application of the network flow algorithm to the network flow graph) a solution is successively determined for later time windows with a solution for earlier time windows being kept constant. Furthermore, at least in the second through ith application of the network flow algorithm to the network flow graph, at least one connector of the network flow graph is given a definable cost factor in accordance with at least one definable (in general heuristic) rule, so that with each further setting of an allocation of the m resources to the k jobs, a successively optimized allocation is obtained in respect of the definable rules.

Thus, the invention embodiment need not apply very general optimization algorithms, as is the case in the prior art, but in apply algorithms tailored specifically by the heuristic rules to the problem.

The characteristics of the problems dealt with are as follows: Simple constraints and the existence of very many solutions.

The inventive method is especially suited to allocation problems with the characteristic "weakly coupled". The characteristic "weakly coupled" is defined as follows:

Activities (jobs) which have yet to be scheduled have already been assigned a resource (for example, breaks which apply to precisely one worker).

Jobs which have still to be allocated resources are already scheduled, i.e. they have fixed start and end times.

Inventively this means that a specific algorithm which is as efficient as possible is applied which solves precisely this class of problem.

In the inventive method movable downtimes/idle times of resources, such as breaks for employees, maintenance times for machines and such like, are advantageously arranged as jobs in the network graph. To this extent these types of downtime can advantageously by shifted as regards optimizing a utilization of a resource. The inventive method in particular makes it possible to ensure that these types of downtimes/idle times are not interrupted in an allocation, as is the case with a conventional application of network flow algorithms. In more general terms this applies for each job, provided this is a component of the requirements.

A heuristic rule is preferably employed in the inventive method, according to which a resource should not change location or only change location slightly, which can be especially achieved by a resource being assigned the same or similar jobs. It is advantageous here if, for the case in which a job has already been assigned in an allocation of a resource in a time window, in a subsequent application of the network flow algorithm to the network flow graph for determination of a further allocation in the network flow graph, connectors with a comparatively low cost factor (e.g. zero) are created for the time window following this time window. Conversely it is very advantageous in the inventive method if, in the event of no job having been assigned for an allocation of a resource in a time window, in a subsequent application of the network flow algorithm for determination of a further allocation in the network flow graph, connectors with a comparatively high cost factor (e.g. infinite) are created for the time intervals following the time interval.

In the inventive method a skillful choice of heuristic rules can thus be used to obtain an optimization of the runtime behavior and thus of the solution. It is not sensible here to directly implement the optimization function for job change optimization; instead the job change will be optimized by additional connectors being inserted in a suitable manner into the network flow graph. If workers are assigned jobs in a specific time interval, the connectors with a low cost factor, especially zero, are added to the network flow graph for the following time interval. If time intervals are detected, in which no more jobs have to be scheduled, then the algorithm uses a sequence of network problems with graphs for a time interval in each case.

This method reduces the size of the problem significantly since the following then generally applies: $m^2+n^2 \ll (m+n)^2$.

Should no such intervals exist and if the size of the problem can no longer be resolved interactively, an approximation solution can be found by the algorithm subdividing the problem into a number of time intervals, to which in each case the approach "weakly coupled", as shown above, is applied.

The short run time thus makes an interactive planning system possible. This in its turn makes the use of human intelligence possible through the realistic option of interactive working. The planner can interactively fix part solutions, where the solution space which has to be searched is reduced, which additionally reduces the processing time.

The invention further extends to a machine-readable memory medium with commands for execution of a method as described above stored on the medium.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
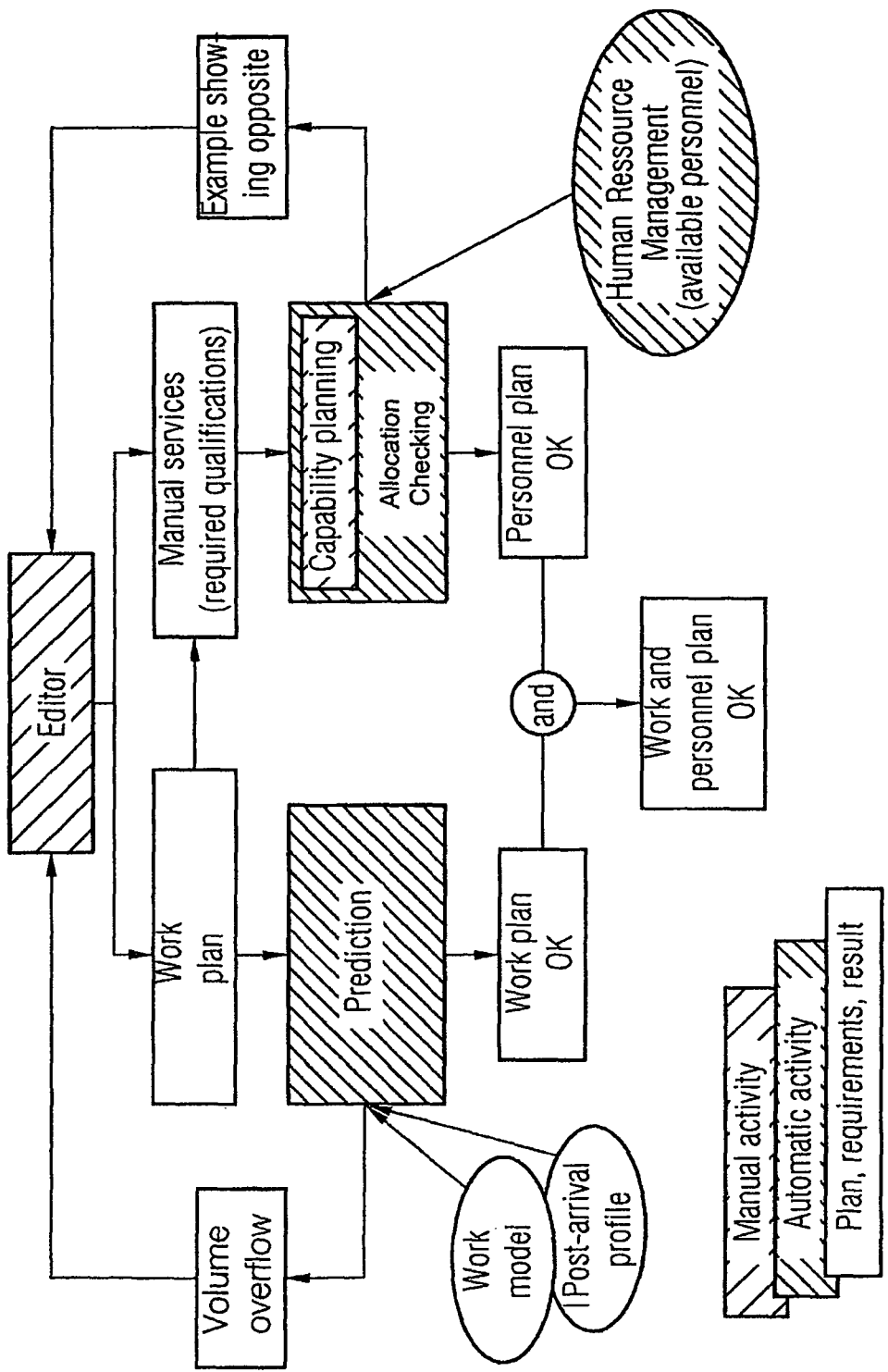
FIG. 1 a flow diagram of the assignment of personnel as part of the planning process, FIG. 2 a network diagram illustrating a dynamically weighted bipartite matching.

Reference will now be made in detail to the preferred embodiments, examples of which are illustrated in the accompanying drawings, wherein like reference numerals refer to like elements throughout. The example discussed below is that of a postal sorting center.

The Planning Process

The tool for assignment of personnel is an integral component of the overall planning process. This planning takes place in a highly dynamic and flexible environment. All personnel assignment functions are semi-automatic and interactive processes, which are supported by consistency checks and decision aids. The planner is to be given the greatest possible support but the overall competence, responsibility and flexibility is to be left to him.

The reader is now referred to FIG. 1, in which the planning process as a whole is described. A planner is intending to plan the work for a given day, with this being done in an interactive manner. The flow diagram shown in FIG. 1 merely schematically illustrates the planning loops.

FIG. 1 shows the complete planning process as was implemented in the exemplary embodiment. The right-hand loop of the figure describes the interactive personnel planning process. The personnel planning software corresponds to the box labeled "capability planning/allocation checking".

The work plan contains all work modes (e.g. resource requirements) for each job as a function of the time, and also the information about all (theoretical) throughputs for each machine and workstation.

A personnel assignment allocates a job (manual services) to personal capabilities. Individual workers with their qualifications, working times and breaks as their attributes represent the workforce resources.

It is necessary to introduce a number of important definitions before the assignment of personnel is explained:

A capability is a particular characteristic which makes it possible for a person to fulfill a job in the postal sorting center.

A qualification is a set of capabilities.

A worker (resource) is a real person who is known to a human resources system. He has a minimum set of attributes: Name, qualification, daily working time, breaks.

A job is a capability required at a workstation with the additional attribute of the time interval which defines the period of time in which this capability is needed at this workstation.

Functional Description of Service Plan Creation

In service plan creation, the planner plans the allocation of work to jobs which have to be executed during operations. The personnel allocation software checks whether the available workers can perform all jobs in the postal sorting center. The mapping allocates workstations (jobs) to an individual worker. It also assigns breaks to workers. The jobs (workstations) are already scheduled and made available to the personnel allocation system by the work plan. The breaks are not scheduled a priori. Only the earliest start time, the latest finishing time and the duration are defined. In general not all workers can perform every job. A job requires a particular capability, however this capability is not present alone in the postal sorting center; i.e. two jobs can require the same or similar capability. A worker can have more than one specific capability.

The personnel allocation software attempts to compute a service plan for each worker so that all jobs can be performed in harmony with the constraints:

Breaks;
Daily working times;
Start time of the jobs;
Finishing times of the jobs;
Particular capability that is required for a job;
Duration of the jobs (in this case the durations are merely produced from the difference between the end time and the start time);
Breaks are contained in a break window;
Break windows have a fixed start and end time;
The daily working times of workers can, in accordance with working time regulations, have one or more break windows;
The total length of a break can vary from one break window to another;

Optimization Goals

Minimize the number of changes of job of a worker during a shift;
Minimize the maximum number of workers in the postal sorting center;

Results

If an allocation is possible for all requirements (job, workstation), the personnel allocation software returns an allocation proposal. This implies a service plan for each employee. In general there is not just one possible proposal. The number of possible allocations (solutions) can grow exponentially with the number of workers and jobs. The planner cannot handle all possible allocations in a sensible manner and therefore he continues interactively:

The personnel allocation software returns an allocation proposal for each worker based on the workstations. This contains the information about personnel not allocated during an entire day or during a shift.

- A service plan proposal for each person with a time list for the working day.
- This implies a list of entirely free but available personnel in the postal sorting center.
- The system can return to the operator an example to show the opposite if it has not found any valid allocation, i.e. a list of times and jobs to which a worker cannot be assigned.

The planner can now change this solution in accordance with his requirements and have it rechecked by the personnel deployment planning software.

How can an Example to Show the Opposite Help the Planner?

If there is no assignment there can again be many examples showing the opposite and it is not evident a priori which result the system should display to the planner.

An example showing the opposite also greatly depends on the algorithm selected by the allocation tool.

An example showing the opposite is a list of jobs (workstations) which, at a particular point in time, cannot be executed by the personnel available at that time. In addition the planner can employ a part solution as an aid (a result that does not fulfill all conditions), if it is found by the system.

A description is now given of the mathematical background which is employed in the personnel allocation system presented above.

Weakly-Coupled Dynamic Network Flow Problem

A sequence of weighted bipartite matchings or minimal cost (transport) problems solve the problem step-by-step and allow preprocessing before each step. An alternative approach is the solution for the allocation of personnel simultaneously for all time intervals. It is a transport problem since breaks can last longer than one unit of time.

Assumptions:

The allocations to the different points in time are only coupled by breaks.
Breaks are not pre-emptive.

This approach does not reduce or minimize a priori the number of job changes. A solution for this problem is subject to the lower target function or a heuristic. The associated linear problem for the dynamic allocation is as follows:

$$\text{Max}\left(\sum_t \sum_{ij} x_{ij}^t\right)$$

Conditions $$\sum_{\{i:(i,j)\in A\}} x_{ij}^t = 1 \forall\, i \in N_1, \forall\, t$$

$$\sum_{\{j:(i,j)\in A\}} x_{ij}^t = 1 \forall\, j \in N_2 - \{\text{breaks}\}, \forall\, t$$

$$x_{ij}^t \geq 0 \forall\, (i,j) \in N_1 \times N_2$$

$$\sum_t \sum_{\{i:(i,j)\in B\}} x_{ij}^{t_l} = a \forall\, i \in N_1, \forall\, t_l$$

$$1 \leq a := \text{break length} \in N_0$$

$$B := N_1 \times N_x - \{\text{breaks}\}$$

$$x_{ij}^t \in \{0,1\}$$

Figure 2:
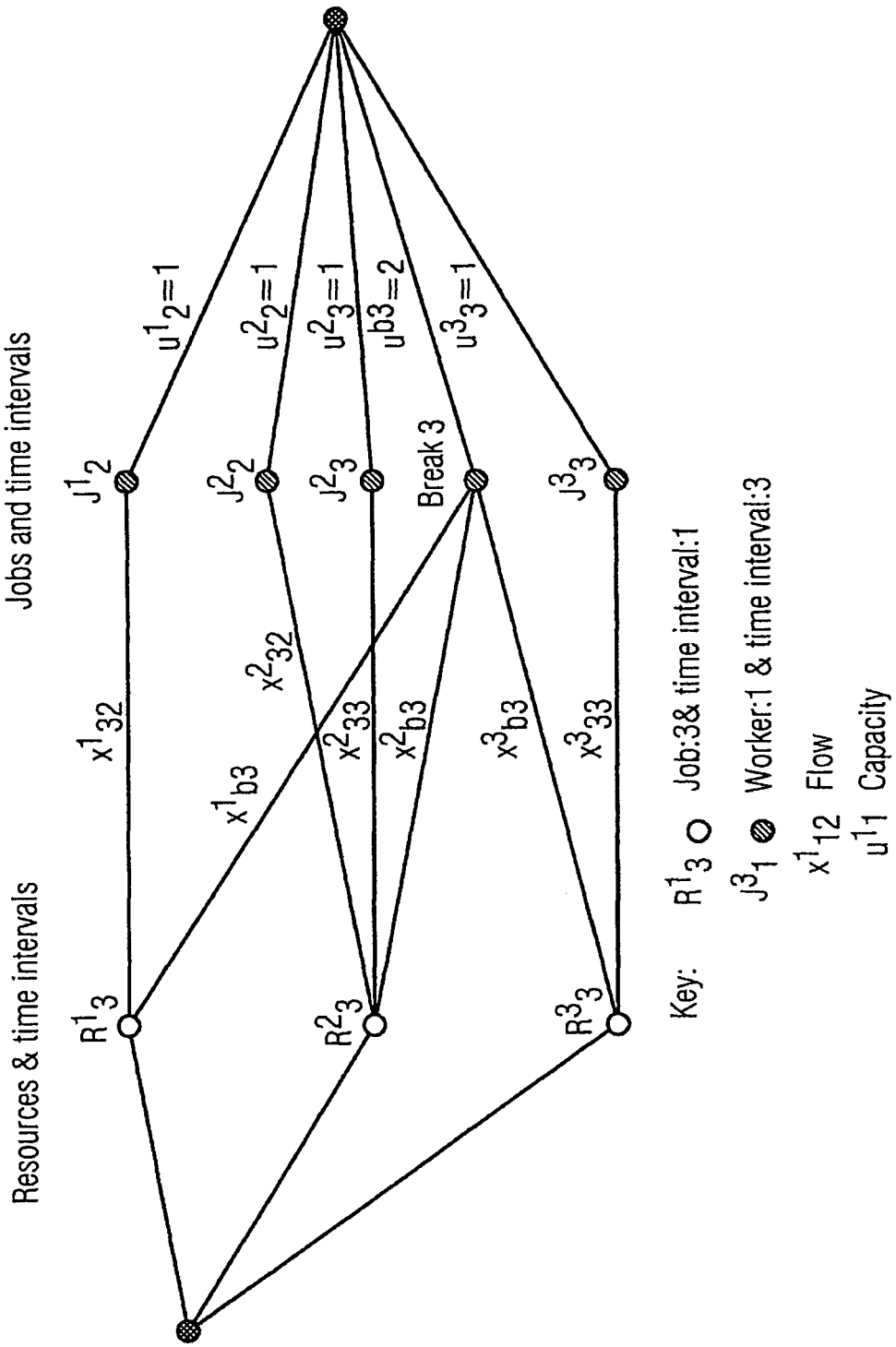

The reader is now referred to FIG. 2, within which a dynamic, weighted, bipartite matching is illustrated. FIG. 2 shows the graph for a processing example consisting of:

3 Time intervals,
1 worker who is available in all 3 intervals,
2 jobs which each last 2 intervals,
1 break which lasts for 2 intervals.

A network algorithm creates a maximum flow which minimizes the target function. A sink defines a section with the capacity $$\sum_t \sum_{\{j \in N_2\}} u_j^t = \text{Total of jobs in each time interval and the break times.}$$

A maximum flow which solves the problem is equal to the capacity of the section.

Processing Complexity for an Equidistant Time Frame
Upper limit of the number of connectors:

$$M = \text{sum}(ni*mi) + \text{sum}S(b)1 << (\text{sum}(ni)*\text{sum}(mi) + \text{sum}S(b)1$$

S(b)1:=Size of the break window for the break b1 in the equidistant time frame.

This shows that the weak coupling in combination the maximum number of connectors in the graph, compared to the full problem, is drastically reduced.

Expansion: Target Function which Minimizes the Job Changes

Target Function:

$$\text{Min}\left(\sum_t \sum_{i,j} c_{ij}^{t_l+1} |x_{ij}^{t_l+1} - x_{ij}^{t_l}|\right)$$

This function produces a minimum value in which the number of job changes is minimal. This is so because the expression $|x_{ij}^{t_{i+1}} - x_{ij}^{t_i}|$ is zero in total if a worker has the same jobs at the times ti and ti+1. The value of this expression is equal to 1 if the worker changes his job, since $x_{ij}^{t_i}$ or $x_{ij}^{t_{i+1}}$ is zero in this case.

Unfortunately this function is not linear, which is why this expansion cannot be applied to a problem of just any size.

The method embodiments can use a system that includes computer hardware and displays as well as permanent or removable storage, such as magnetic and optical discs, RAM, ROM, etc. on which the process and data structures of the present invention can be executed, stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for determining an allocation of m resources $R_m$ to fixed time k jobs $J_k$ equipped with respective suitabilities/capabilities for fulfilling jobs, which are to be executed in k time windows in each case, comprising:
   arranging, by a computer, resource time breaks that can be shifted in time, the m resources and the fixed time k jobs as a time layered network flow graph; and
   determining, by the computer a set allocations of the m resources to k jobs based on the network flow graph by computing a time discretization with n time intervals and by applying a network flow algorithm to the network flow for each interval, with an ith ($1 \leq i \leq n$) assignment of the m resources to the k jobs being retained for the ith application of the network flow algorithm to the network flow graph for the ith to nth time interval of the k jobs, with, in the ith application of the network flow algorithm to the network flow graph, the assignments to the time intervals belonging to the first to ith jobs which were retained in previously executed first to ith applications of the network flow algorithm to the network flow graph, being kept constant for the ith application of the network flow algorithm, and with, in the ith application of the network flow algorithm to the network flow graph, at least one connector of the network flow graph being given a definable cost factor in accordance with at least one definable rule without considering any resource travel time and without considering any job priority; and
   displaying the flow graph on a display.

2. The method as claimed in claim 1, wherein downtimes/breaks of resources are arranged as jobs in the network graph.

3. The method as claimed in claim 1, wherein, for the case in which, in an allocation of a resource in a time window a job has already been assigned, in a subsequent application of the network flow algorithm to the network flow graph, connectors are created with a comparatively low cost factor for the time windows following the time window.

4. The method as claimed in claim 2, in which, for the case in which, in an allocation of a resource in a time window a job has already been assigned, in a subsequent application of the network flow algorithm to the network flow graph, connectors are created with a comparatively low cost factor for the time windows following the time window.

5. The method as claimed claim 3, wherein, for the case in which, in an allocation of a resource in a time window no job has been assigned, in a subsequent application of the network flow algorithm, connectors will be created with a comparatively high cost factor for the time windows following the time window.

6. The method as claimed in claim 1, wherein, for the case in which, in an allocation of a resource in a time window no job has been assigned, in a subsequent application of the network flow algorithm, connectors will be created with a comparatively high cost factor for the time windows following the time window.

7. A non-transitory computer readable storage for controlling a computer with commands stored thereon for executing a method for determining an allocation of m resources $R_m$ to fixed time k jobs $J_k$ equipped with respective suitabilities/capabilities for fulfilling jobs, which are to be executed in k time windows in each case, comprising:
   arranging resource time breaks that can be shifted in time, the m resources and the fixed time k jobs as a time layered network flow graph; and
   determining, by the computer a set allocations of the m resources to k jobs based on the network flow graph by computing a time discretization with n time intervals and by applying a network flow algorithm to the network flow for each interval, with an ith ($1 \leq i \leq n$) assignment of the m resources to the k jobs being retained for the ith application of the network flow algorithm to the network flow graph for the ith to nth time interval of the k jobs, with, in the ith application of the network flow algorithm to the network flow graph, the assignments to the time intervals belonging to the first to ith jobs which were retained in previously executed first to ith applications of the network flow algorithm to the network flow graph, being kept constant for the ith application of the network flow algorithm, and with, in the ith application of the network flow algorithm to the network flow graph, at least one connector of the network flow graph being given a definable cost factor in accordance with at least one definable rule without considering any resource travel time and without considering any job priority; and
   displaying the flow graph on a display.

8. The storage as claimed in claim 7, wherein, for the case in which, in an allocation of a resource in a time window no job has been assigned, in a subsequent application of the network flow algorithm, connectors will be created with a comparatively high cost factor for the time windows following the time window.

9. The storage as claimed in claim 8, wherein, for the case in which, in an allocation of a resource in a time window a job has been assigned, in a subsequent application of the network flow algorithm to the network flow graph, connectors are created with a comparatively low cost factor for the time windows following the time window.

* * * * *

UNITED STATES PATENT AND TRADEMARK OFFICE
CERTIFICATE OF CORRECTION

PATENT NO. : 8,428,990 B2
APPLICATION NO. : 11/990635
DATED : April 23, 2013
INVENTOR(S) : Christopher Moll et al.

Page 1 of 1

It is certified that error appears in the above-identified patent and that said Letters Patent is hereby corrected as shown below:

In the Claims:

Column 8, Line 7 (Approx.), In Claim 5, delete "claimed claim" and insert -- claimed in claim --, therefor.

Signed and Sealed this
Sixth Day of August, 2013

Teresa Stanek Rea
*Acting Director of the United States Patent and Trademark Office*